United States Patent [19]
Boyd

[11] Patent Number: 5,985,004
[45] Date of Patent: Nov. 16, 1999

[54] MIST ELIMINATOR

[76] Inventor: Edward Lee Boyd, 3426 Gulf Freeway, Suite 281, Dickenson, Tex. 77539

[21] Appl. No.: 09/042,927

[22] Filed: Mar. 17, 1998

[51] Int. Cl.$^6$ .......................... B01D 19/00; B01D 39/12
[52] U.S. Cl. ................... 95/241; 96/189; 55/492; 55/505; 55/525
[58] Field of Search .................... 55/525, 526, 498, 55/485, 486, 487, 508, 478, 480, 490, DIG. 23, 505, 492; 95/273, 214, 241; 96/188, 189, 190, 191

[56] References Cited

U.S. PATENT DOCUMENTS

| | | | |
|---|---|---|---|
| 428,954 | 5/1890 | Robertson | 55/DIG. 23 |
| 1,512,950 | 10/1924 | Ryan . | |
| 2,402,140 | 6/1946 | Heintzelman . | |
| 2,514,623 | 7/1950 | Brown | 55/487 |
| 3,010,537 | 11/1961 | Baker et al. . | |
| 3,540,190 | 11/1970 | Brink, Jr. . | |
| 3,703,070 | 11/1972 | Pasichnyk | 55/526 |
| 4,243,397 | 1/1981 | Tokar et al. . | |
| 5,290,446 | 3/1994 | Degen et al. | 55/487 |
| 5,632,791 | 5/1997 | Oussoren et al. | 55/486 |

*Primary Examiner*—David A. Simmons
*Assistant Examiner*—Robert Hopkins
*Attorney, Agent, or Firm*—John R Casperson

[57] ABSTRACT

A mist eliminator cartridge generally comprises a roll of mesh in the form of a tube mounted to an annular flange and extending normally from a face of the flange. The face of the flange of the cartridge is positioned against an annular face positioned peripherally around the an upper gas outlet in a mist eliminator vessel. The roll of mesh extends into the vessel from the upper gas outlet. The cartridge provides a simple way to retrofit a vessel to prevent liquid carryover.

18 Claims, 2 Drawing Sheets

MIST ELIMINATOR

BACKGROUND OF THE INVENTION

In one aspect, this invention relates to a mist eliminator cartridge. In another aspect, this invention relates to a mist eliminator unit which contains a mist eliminator cartridge. In yet another aspect, this invention relates to a mist eliminator cartridge which can be easily installed in a mist eliminator vessel to eliminate a liquid carryover problem which has developed since the vessel was initially installed.

It is known that pads of mesh can be used to eliminate mist from a gas stream carrying entrained liquid. The vessels designed for such mist elimination carry the pads on internally built frames. Installation, repair or replacement of the pads and/or frames generally requires cutting into the vessel for access, rewelding the vessel once the turnaround is complete, and having the vessel recertified prior to being placed back on line. A technique for positioning a mist eliminator pad in a mist eliminator vessel which does not require cutting, welding and recertification would be very desirable.

OBJECTS OF THE INVENTION

It is an object of this invention to provide a method for controlling mist carryover through a vessel which can be implemented without cutting into the vessel.

It is another object of this invention to provide a novel apparatus for mist elimination which can easily be formed by modification of existing apparatus.

It is a further object of this invention to provide a mist eliminator cartridge which is well suited for use in the above method and apparatus.

SUMMARY OF THE INVENTION

In one aspect, the invention provides a method for reducing liquid entrainment in a gas stream passing through a vessel from a gas inlet to an upper gas outlet. The invention is advantageously applied where the vessel includes an annular face peripherally positioned around the upper gas outlet and defining an outside perimeter of the outlet. The method is carried out by positioning a mist eliminator cartridge in the vessel so that the gas stream passes through a sidewall of the mist eliminator cartridge and liquid carried by the gas stream coalesces in the sidewall of the cartridge. Where this is done, the gas stream flowing from the vessel through the outlet carries less liquid entrainment than the gas stream flowing into the vessel through the inlet.

The mist eliminator cartridge generally comprises a roll of mesh in the form of a tube mounted to an annular flange and extending normally from a face of the flange. The face of the flange of the cartridge is positioned against the annular face positioned peripherally around the upper gas outlet.

The roll of mesh extends into the vessel from the upper gas outlet.

Preferably, the cartridge-type mist eliminator is formed from an annular flange, a tubularly shaped framework, and a roll of mesh. The annular flange has a first annular face and an oppositely facing second annular face. The annular flange has an outside diameter and an inside diameter. The tubularly shaped framework is attached to the first annular face and extends generally normally from the first annular face. The mesh is wound around the tubularly shaped framework to form a roll of mesh having a plurality of layers and a hollow core. The roll has a first end a second end. The roll is supported by the tubularly shaped framework and has an outside diameter which is less than the outside diameter of the annular flange. The first end of the roll is positioned adjacent to the first annular face.

The cartridge is preferably employed in a closed pressure vessel having a gas inlet and a gas outlet. The gas outlet is positioned in an upper portion of the vessel. An annular flange face is peripherally positioned around the gas outlet. The first annular face of the cartridge type mist eliminator is positioned against the annular flange face peripherally positioned around the gas outlet. At least a portion of the roll of mesh is positioned inside of the vessel so that gas flowing from the gas inlet of the vessel to the gas outlet of the vessel flows through a sidewall of the roll of mesh.

In the past, eliminating a mist carryover problem was time consuming, laborious, and expensive. The vessel had to be cut into, the frames and pads installed, and the vessel then had to be rewelded and recertified. With the invention, the exhaust pipe has to be disconnected, the cartridge-type mist eliminated dropped into position, and then the exhaust pipe reconnected, which is a simple unbolting-rebolting operation and does not require recertification. The invention can also be employed in vessels which already contain mist eliminator frames and pads (space permitting) to increase the efficiency of mist elimination in a simple and cost effective manner.

DETAILED DESCRIPTION OF THE INVENTION

Figure 2:
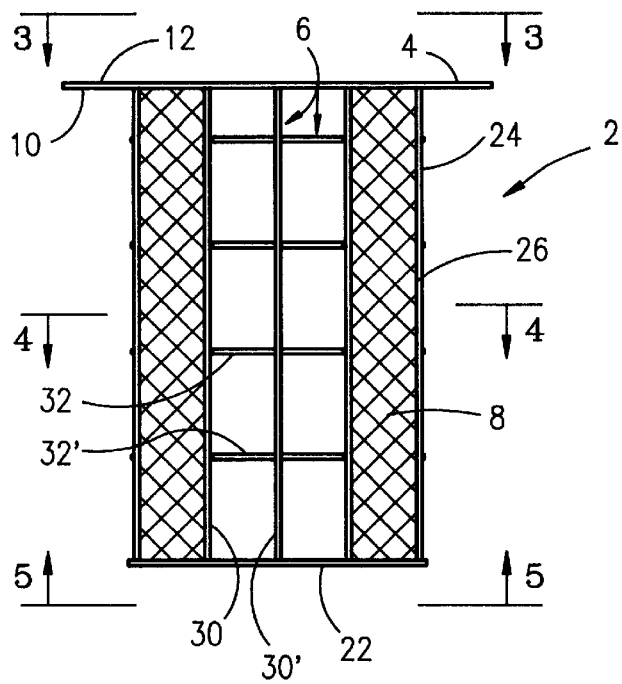
FIG. 2 is a detailed view of a portion of the vessel shown in FIG. 1.
Figure 3:
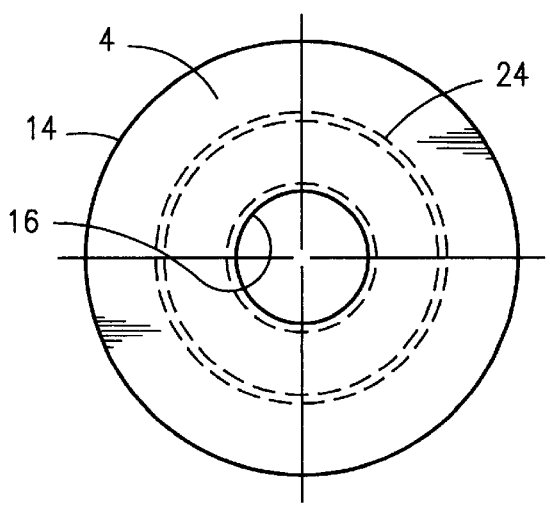
FIG. 3 is a top end view of the device shown in FIG. 2 when viewed along lines 3—3.
Figure 4:
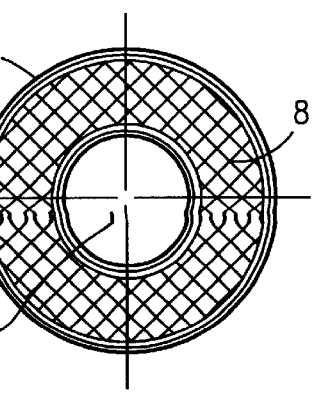
FIG. 4 is a cross sectional view of the device shown in FIG. 2 when viewed along lines 4—4.
Figure 5:
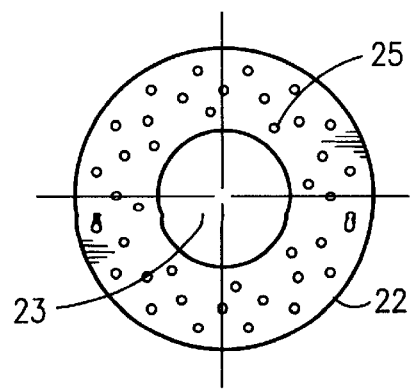
FIG. 5 is a bottom end view of the device shown in FIG. 2 when viewed along lines 5—5.

With reference to FIGS. 2–4, a cartridge-type mist eliminator 2 comprises an annular flange 4, a tubularly shaped framework 6 and a mesh 8.

The annular flange 4 has a first annular face 10 and an oppositely facing second annular face 12. The annular flange has an outside diameter 14 and an inside diameter 16. The tubularly shaped framework 6 is attached to the first annular face 10 and extends generally normally from the face 10. The mesh 8 is wound around the tubularly shaped framework 6 to form a roll of mesh having a plurality of layers and a hollow core 18. The roll is supported by the tubularly shaped framework 6 and has an outside diameter 20 which is less than the outside diameter 14 of the annular flange 4. A first end of the roll of mesh is positioned adjacent to the first annular face 10 of the flange.

Preferably, a generally disk-shaped plate 22 is positioned on a second end of the roll of mesh 8. The disk is preferably positioned generally parallel to the annular flange 4 and at least a central portion 23 is preferably substantially imperforate. An annular portion of the plate 22 can be provided with a plurality of perforations or apertures to provide for gas flow and lower pressure drop. The annular portion is preferably positioned beneath the second end of the roll of mesh. The mist eliminator 2 has a longitudinal axis extending from the annular flange to the plate and is generally rotationally symmetric around the longitudinal axis.

In a preferred embodiment, the mist eliminator 2 further comprises a generally tubular shield 24 attached to the first annular face and extending generally normally therefrom. The generally tubular shield 24 is positioned radially outwardly from a portion of the roll of mesh adjacent to the annular flange. See also the dotted lines in FIG. 3. The generally tubular shield 24 has a first end attached to the first annular face 10 and a second end 26 which is positioned between the first annular face and the second end of the roll of mesh at a spaced apart distance from the end of the roll of mesh.

Generally speaking, the roll of mesh will contain in the range of from about 2 to about 200 layers of mesh, usually in the range of from about 3 to 10 layers. The roll will generally have a wall thickness in the range of from about 0.2 to about 20 inches, usually in the range of from about 0.5 to about 5 inches, the wall being formed by the layers of mesh. The mesh is preferably formed from wire. The wire diameter will generally be in the range of from about 0.002 to about 0.2 inches, usually in the range of from about 0.003 to about 0.03 inches. The wire will usually be formed from a material which will not quickly deteriorate under service conditions. Metals, such a stainless steel, nickel or monel, depending on service, or plastics, such as Nylon (tm) or Teflon (tm), may be used. Number 304 stainless steel wire having a diameter of 0.006 or 0.011 inches is expected to provide good results for many applications. The weave of the mesh can be selected as desired to provide a proper balance between coalescence and pressure drop. Knitted mesh having an apparent bulk density in the range of about 4 pounds to about 40 pounds per cubic foot, usually in the range of about 8 to about 25 pounds per cubic foot, is believed highly suitable for many applications.

In the illustrated embodiment, the tubularly shaped framework 6 is comprised of a plurality of parallel rods 30, 30' arranged in a generally cylindrical layout and joined together by a plurality of parallel, spaced apart generally circular rings 32, 32'. The rings are preferably positioned at a right angle to the parallel rods. The rods and rings can be formed from rod stock, such as ¼ inch stainless. The rods and the rings can be spaced about 4 inches apart and provide good results.

Figure 1:
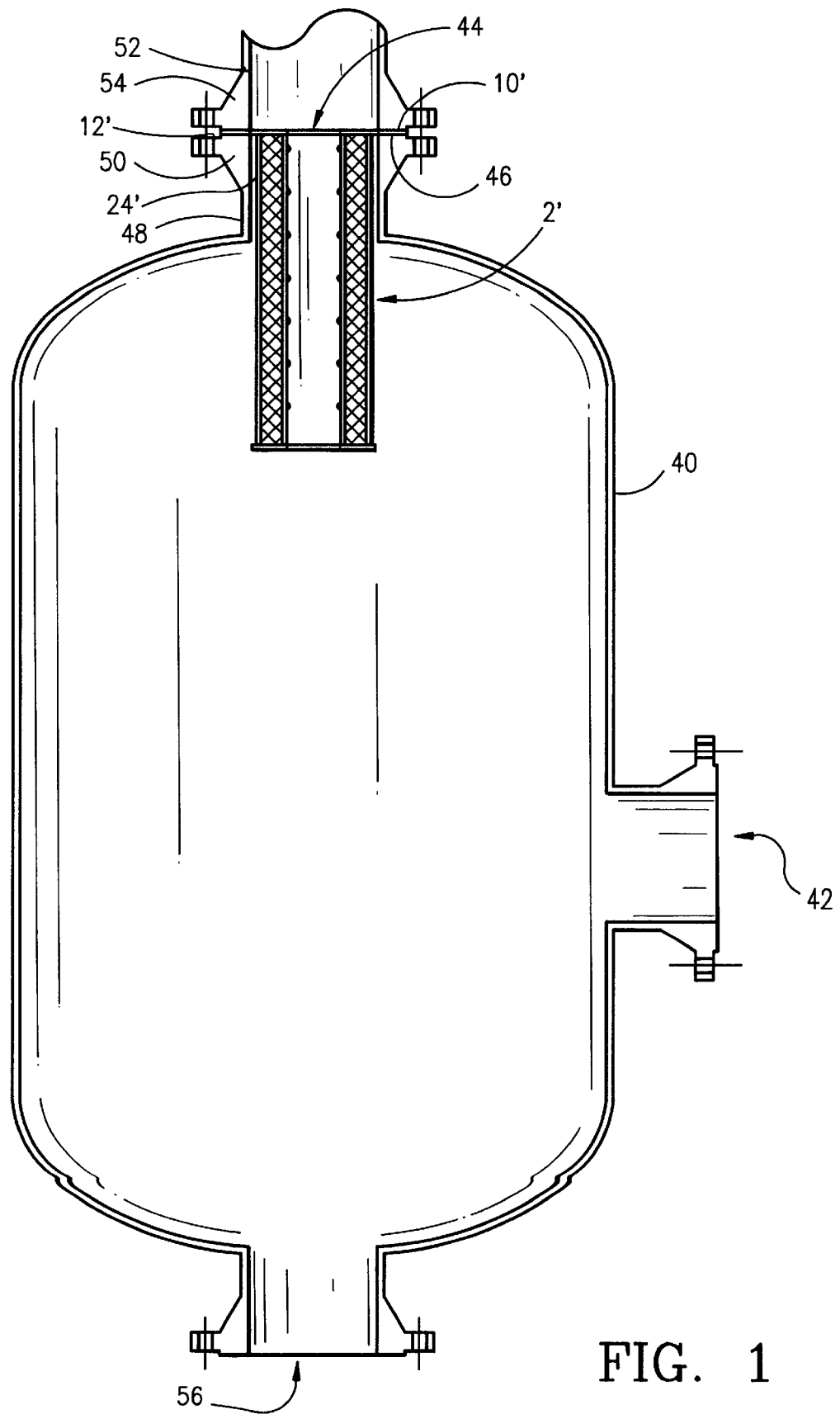
FIG. 1 is a cross-sectional view of a vessel employing one embodiment of the present invention.

FIG. 1 illustrates an exemplary mist eliminator system which employs the invention. The mist eliminator cartridge 2' is employed in combination with a closed pressure vessel 40. The pressure vessel 40 has a gas inlet 42 and a gas outlet 44. Generally speaking, the gas outlet is positioned in an upper portion of the vessel, usually at the upper end.

An annular outwardly-facing flange face 46 is peripherally positioned around the gas outlet 44. The first annular face 10' of the cartridge type mist eliminator 2' is positioned against the annular outwardly facing flange face 46. At least a portion of the roll of mesh 8 is positioned inside of the vessel 40 so that gas flowing from the gas inlet 42 of the vessel to the gas outlet 44 of the vessel flows through a sidewall of the roll of mesh.

Preferably, the outside diameter of the roll of mesh is less than the inside diameter of the gas outlet 44, so that the roll of mesh can be inserted into the vessel through the gas outlet. In the illustrated embodiment, the gas outlet 44 is defined by a nozzle 48 extending from the vessel. The nozzle has a first end attached to an outer wall of the vessel and a second end which defines the gas outlet. An annular flange 50 is positioned around the gas outlet at the second end of the nozzle and defines the flange face 46. The generally tubular shield 24' is radially positioned between the nozzle and the roll of mesh.

Sealing of the mist eliminator cartridge in the system is preferably provided by an exhaust pipe 52 which has an inlet end with a flange 54 peripherally positioned around the inlet end. The flange 54 at the inlet end of the exhaust pipe is in sealing engagement with the second face 12' of the annular flange of the mist eliminator. The first face 10' of the annular flange of the mist eliminator is in sealing engagement with the annular flange 50 at the second end of the nozzle. Sealing can be conventionally facilitated with bolt rings and gaskets or sealing compound, for example.

A liquid outlet 56 is positioned in a lower portion of the vessel, usually at the bottom end to provide for the removal of coalesced liquid which drips from the mist eliminator.

In one aspect, the invention provides a method for reducing liquid entrainment in a gas stream passing through a vessel from a gas inlet to an upper gas outlet. The invention is advantageously applied where the vessel includes an annular face peripherally positioned around the upper gas outlet and defining an outside perimeter of the outlet. The method is carried out by positioning a mist eliminator cartridge in the vessel so that the gas stream passes through a sidewall of the mist eliminator cartridge and liquid carried by the gas stream coalesces in the sidewall of the cartridge.

The mist eliminator cartridge generally comprises a roll of mesh in the form of a tube mounted to an annular flange and extending normally from a face of the flange. The face of the flange of the cartridge is positioned against the annular face positioned peripherally around the upper gas outlet.

The roll of mesh extends into the vessel from the upper gas outlet.

The diameter of the roll of mesh is preferably sufficiently small so that the roll of mesh can be inserted into the vessel through the upper gas outlet of the vessel. This can be done by detaching an exhaust pipe from the upper gas outlet, inserting the roll of mesh into the vessel through the upper gas outlet, and then reattaching the exhaust pipe to the upper gas outlet. The vessel preferably has an upper end and a lower end and a longitudinal axis extending between the upper end and the lower end. The upper gas outlet is positioned at the upper end of the vessel and on the longitudinal axis of the vessel. The roll of mesh extends into the vessel coaxially with the longitudinal axis. A plate is positioned at a lower end of the roll of mesh to prevent the gas stream from bypassing the sidewall of the roll of mesh. Gas flow is preferably generally radially inward through the sidewall of the roll of mesh. Coalesced liquid drips from the mist eliminator cartridge and is removed via a liquid outlet at the lower end of the vessel.

What is claimed is:

1. A cartridge type mist eliminator comprising:
  an annular flange having a first annular face and an oppositely facing second annular face, said annular flange having an outside diameter and an inside diameter;
  a tubularly shaped framework formed from rod stock attached to the first annular face and extending generally normally therefrom;
  a wire mesh wound around the tubularly shaped framework to form a roll of wire mesh having a plurality of layers and a hollow core, said roll being supported by the tubularly shaped framework and having an outside diameter which is less than the outside diameter of the annular flange, a first end adjacent to the first annular face, and a second end; and
  a generally disk-shaped plate positioned on the second end of the roll of mesh and generally parallel to the annular flange, wherein the mist eliminator has a longitudinal axis extending from the annular flange to the plate and is generally rotationally symmetric around the longitudinal axis.

2. A mist eliminator as in claim 1 wherein the generally disk-shaped plate is substantially imperforate.

3. A mist eliminator as in claim 2 further comprising a generally tubular shield attached to the first annular face and extending generally normally therefrom, said generally tubular shield being positioned radially outwardly from a portion of the roll of mesh adjacent to the annular flange.

4. A mist eliminator as in claim 3 wherein the generally tubular shield has a first end attached to the first annular face and a second end which is positioned between the first annular face and the second end of the roll of mesh at a spaced apart distance from the end of the roll of mesh.

5. A mist eliminator as in claim 3 wherein the roll of mesh contains in the range of from about 3 to about 10 layers of mesh.

6. A mist eliminator as in claim 3 wherein the roll of mesh has a wall thickness in the range of from about 0.5 to about 5 inches.

7. A mist eliminator as in claim 3 wherein the mesh is formed from wire having a thickness in the range of from about 0.003 to about 0.030 inches.

8. A mist eliminator as in claim 7 wherein the mesh is formed from metal wire and has an apparent bulk density in the range of from about 8 to about 25 pounds per cubic foot.

9. A mist eliminator as in claim 3 wherein the framework is comprised of a plurality of parallel rods arranged in a generally cylindrical layout and joined together by a plurality of parallel, spaced apart generally circular rings.

10. A mist eliminator as in claim 3 further comprising, in combination a closed pressure vessel having a gas inlet and a gas outlet, wherein the gas outlet is positioned in an upper portion of the vessel;

an annular outwardly-facing flange face peripherally positioned around the gas outlet;

wherein the first annular face of the cartridge type mist eliminator is positioned against the annular outwardly facing flange face peripherally positioned around the gas outlet; and at least a portion of the roll of mesh is positioned inside of the vessel so that gas flowing from the gas inlet of the vessel to the gas outlet of the vessel flows through a sidewall of the roll of mesh.

11. A mist eliminator as in claim 10 wherein the gas outlet has an inside diameter and the roll of mesh has an outside diameter which is less than the inside diameter of the gas outlet, so that the mesh can be inserted into the vessel through the gas outlet.

12. A mist eliminator as in claim 11 wherein the gas outlet is defined by a nozzle extending from the vessel, said nozzle having a first end attached to an outer wall of the vessel and a second end which defines the gas outlet; and an annular flange is positioned around the gas outlet at the second end of the nozzle and defines the flange face.

13. A mist eliminator as in claim 10 wherein the generally tubular shield is radially positioned between the nozzle and the roll of mesh.

14. A mist eliminator as in claim 10 further comprising, in combination, an exhaust pipe having an inlet end with a flange peripherally positioned around the inlet end;

wherein the flange at the inlet end of the exhaust pipe is in sealing engagement with the second face of the annular flange of the mist eliminator, and the first face of the annular flange of the mist eliminator is in sealing engagement with the annular flange at the second end of the nozzle.

15. A mist eliminator as in claim 14 further comprising a liquid outlet positioned in a lower portion of the vessel.

16. A method for retrofitting a vessel to reduce liquid entrainment in a gas stream passing through the vessel from a gas inlet to an upper gas outlet, wherein an annular flange having an annular face facing away from the vessel is peripherally positioned around the upper gas outlet and defines an outside perimeter of the outlet, said method comprising detaching an exhaust pipe from the upper gas outlet, said exhaust pipe having an inlet end with a flange peripherally positioned around the inlet end;

positioning a mist eliminator cartridge in the vessel so that the gas stream passes through a sidewall of the mist eliminator cartridge and liquid carried by the gas stream coalesces in the sidewall of the cartridge, whereby the gas stream flowing through the outlet carries less liquid entrainment than the gas stream flowing through the inlet, wherein the mist eliminator cartridge comprises a roll of mesh in the form of a tube mounted to an annular flange and extending normally from a face of the flange, wherein the face of the flange of the cartridge is positioned against the annular face positioned peripherally around the upper gas outlet, and the roll of mesh extends into the vessel from the upper gas outlet, said method further comprising reattaching the exhaust pipe to the upper gas outlet so that the flange at the inlet end of the exhaust pipe is in sealing engagement with a second face of the flange of the cartridge.

17. A method as in claim 16 further comprising inserting the roll of mesh into the vessel through the upper gas outlet of the vessel.

18. A method as in claim 16 wherein the vessel has an upper end and a lower end and a longitudinal axis extends between the upper end and the lower end, the upper gas outlet is positioned at the upper end of the vessel and on the longitudinal axis of the vessel;

the roll of mesh extends into the vessel coaxially with the longitudinal axis; and a plate is positioned at a lower end of the roll of mesh to prevent the gas stream from bypassing the sidewall of the roll of mesh.

* * * * *